Jan. 24, 1956 A. C. TRAVIS, JR 2,732,437

MAGNETIC TAPE RECORDER

Filed May 10, 1952 3 Sheets-Sheet 1

INVENTOR
ALBERT C. TRAVIS, JR.
BY John E. Hubbell
ATTORNEY

MAGNETIC TAPE RECORDER

Filed May 10, 1952 3 Sheets-Sheet 2

INVENTOR
ALBERT C. TRAVIS, JR.
BY John E. Hubbell
ATTORNEY

INVENTOR
ALBERT C. TRAVIS, JR.
BY John E. Hubbell
ATTORNEY 2,732,437
Patented Jan. 24, 1956

2,732,437

MAGNETIC TAPE RECORDER

Albert C. Travis, Jr., Richmond Hill, N. Y., assignor to Broadcast Equipment Specialties Corp., New York, N. Y., a corporation of New York Application May 10, 1952, Serial No. 287,171
5 Claims. (Cl. 179—100.2)

The general object of the present invention is to provide an improved magnetic tape recorder. A primary object of the invention is to provide a relatively light weight, self-contained, portable recorder adapted for various uses, and particularly for reportorial use in recording oral answers to, or statements overheard by a news reporter or other investigator.

A major object of the invention is to provide a novel and effective tape-feed and rewind mechanism for actuation by a spring motor which may be of well known type, and which is arranged for cooperation with said mechanism to move the tape from a supply reel to a take-up reel at a suitable and substantially constant speed, regardless of the relative amounts of tape on the two reels, and which is operative to feed all or a portion of the tape on the take-up reel back to the supply reel at a higher speed whenever such rewind is desirable to play back or erase words or other sounds previously recorded.

A more specific object of the invention is to provide a simple and effective magnetic tape recorder so constructed and operated as to minimize friction losses, and any significant tendency to speed loss because of tape drag, or the recording process. The avoidance of such losses contribute materially to the practical possibility of using a drive motor such as the well known spring motor with a relatively low power output, long in use to rotate phonograph discs and cylinders. The spring motor driven tape recorder has a very real practical advantage over the usual electrically driven tape recorder for reportorial use, in that it is wholly self-contained and requires no recharging or replacement of batteries for mechanical drive, or means for connecting the driving mechanism to an external source of electric current. The manual rewinding of the spring motor demands only a relatively insignificant portion of the available muscular energy of the user.

A further practically important object of the invention is to provide a tape recorder which does not require or include drive belts or clutches which slip.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 3:
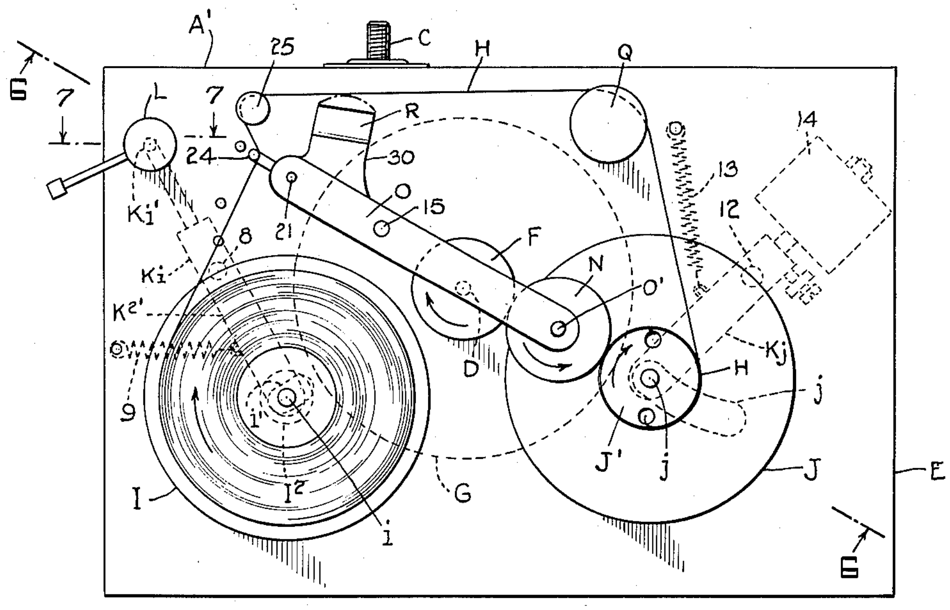
Fig. 3 is a diagrammatic front elevation, with parts removed, of the recorder in its "drive" condition.

Fif. 7 is an enlarged section on the line 7—7 of Fig. 3.

The recorder mechanism illustrated in the drawings, by way of example, comprises a casing structure or housing A, which in its normal operative condition is similar in size and form to an ordinary overnight bag. The casing A comprises a removable section *a*, separable from the body portion of the casing, which may be connected at its lower edge to the lower edge of the body portion of the casing, by separable hinge or coupling members 1 and 2. The upper edge portions of the casing body and removable section *a* are normally connected by luggage type locking elements 3 and 4. While the dimensions of the housing A may be widely varied, it is noted, by way of illustration and example, that in one desirable embodiment of my invention, the casing structure A has a length of about 14.25 inches, a height of about 10.5 inches, and a width or depth of about 5.5 inches.

An elbow shaped member B has a short arm B' extending upward from the upper side A' of the body portion of the casing A, and has a longer arm portion parallel to said side. The short uprising arm portion B' of the member B is formed with a threaded socket in which the threaded upper end portion of a shaft C is screwed. The shaft C is the rotatable winding shaft C of a spring motor CA. The shaft C is perpendicular to and extends through the casing top wall A'. The other end of the arm B is connected by a pivot 5 to a part *b* movable between its depending position shown in Fig. 1 and its upwardly extending position shown in Fig. 2. In its Fig. 1 position, the part *b* serves as a latch bar connecting the otherwise free end of the member B to a bracket 6 attached to the casing top wall A', so that the parts B, B' and *b* form a recorder carrying handle. As shown, the part *b* is formed with a slot *b'* adapted to receive a pin 7 carried by the bracket 6. In its position shown in Fig. 2, the part *b* serves as a knob extending upwardly away from the free end of the member B, and the parts B, B' and *b* then collectively serve as a crank for rotating the shaft C to rewind the motor CA.

The spring motor CA has a driving or output shaft D, and may well be, and is herein assumed to be, of a known type including a fly-ball governor and brake cooperating to rotate the motor output shaft D at a substantially constant speed. In practice, I now contemplate the use of a spring motor of a type which has long been used to rotate phonograph records, and which may well be of the commercial form known as the "Master Junior-Single Spring Motor," made and sold by the "General Industries Company" of Elyria, Ohio, and need not be further described herein.

Figure 2:
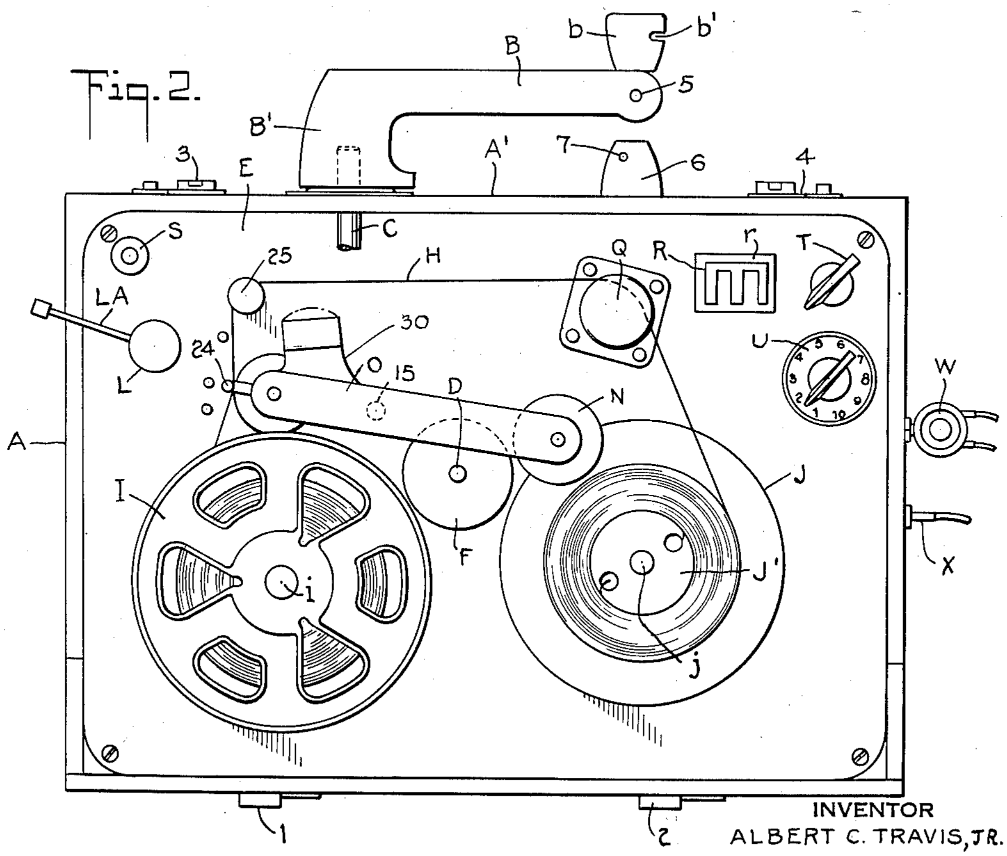
Fig. 2 is a front elevation of the recorder shown in Fig. 1, with a separable portion of its casing removed, and with its motor in its idle condition.

The front wall of the body portion of the recorder casing A, as seen in Fig. 2, is a base plate E detachably secured to the casing body portion, and is in front of the chassis of the spring motor CA, which is attached to and supported by said plate. The spring motor driving shaft D extends loosely through the base plate E and has a driving wheel F secured to its front end. At the rear side of the base plate E, the shaft D is secured to and rotates a fly wheel G. While the motor output shaft D and the wheels F and G rotate only in one direction, the shaft D is optionally operative through the wheel F to move magnetic recording tape H from a supply reel I to a take-up reel J, and through the fly wheel G to move said tape from the take up reel J to the supply reel I. The reels I and J are in front of the base plate E and are supported by shafts *i* and *j* respectively, which are perpendicular to and extend through the base plate E. As is hereinafter explained, the shaft *i* may be moved transversely of its length into and out of an operative position in which it is frictionally coupled to and rotated by the fly wheel G, and the shaft *j* may be independently moved transversely of its length into and out of an operative position in which it is frictionally coupled to the drive wheel F. The conditions under which the shafts *i* and *j* are maintained in their respective operative positions are hereinafter described.

The reel shaft *i* is journaled in an arm K*i* pivotally supported by a stationary pin or post 8 mounted in a bracket K, connected to and supported by the base plate E. The post 8 is laterally displaced from the shaft *i*, so that the angular adjustment of the arm K*i* about the pivot 8 will move the shaft *i* toward and away from the periphery of the fly wheel G. The reel I comprises a spool portion I' about which tape H is wound, and also comprises a hub portion $I^2$ connected to the spool I' and arranged to engage the periphery of the fly wheel G when the arm K*i* is angularly adjusted into the position shown in full lines in Fig. 5 and in dotted lines in Fig. 4. The hub $I^2$, or at least the rim portion of said hub, is formed of rubber and when in engagement with the wheel G the contact pressure between said hub and wheel is such that the latter tends to rotate the reel I in the counterclockwise direction. Whether the wheel G then rotates the reel I or merely prevents the reel J from rotating in the clockwise direction depends on whether the hereinafter described control arm O is then in or out of its position shown in Fig. 5.

Figure 1:
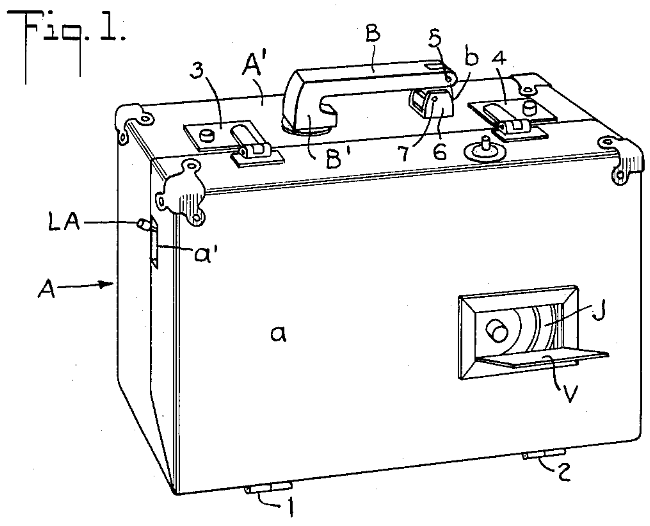
Fig. 1 is a perspective view of a portable magnetic tape recorder.
Figure 7:
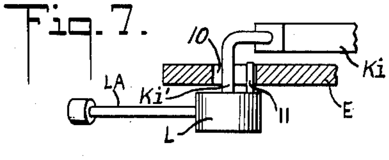

The arm K*i* is biased by a spring 9 to move the hub $I^2$ away from the wheel G. However, the hub $I^2$ may be turned into frictional engagement with the wheel G by an angular adjustment of a control element L. The latter is shown as a hub like part mounted on and angularly adjustable about a transverse end portion K*i*' of the member K*i*. Said extension passes through a circular opening 10 in the base plate E which is substantially larger in diameter than said extension. As shown in Fig. 7, the extension K*i*' has a threaded end received in a threaded socket formed in the member L and may be turned angularly about the extension K*i*' through an angle of 60° or so, by means of an operating arm L*a* secured to and extending radially away from the member L. The angular adjustment of the member L on the extension K*i*' subjects the arm K*i* to a cam action turning the arm about the pivot 8 and moving the hub $I^2$ into its dotted line position shown in Fig. 4. The cam action of the member L is directly due to a cam portion 11 of the member L in the form of a pin parallel to, and laterally displaced from the shaft K', which extends into the opening 10 in the plate E and engages the wall surrounding said opening. When the removable housing section is connected to the body portion of the casing A as shown in Fig. 1, the arm LA projects through a casing opening in the form of a notch *a'* in an edge portion of the casing section *a*. Thus the outer end of the arm LA is accessible at all times for adjustment of the member L through its full adjustment range.

Figure 4:
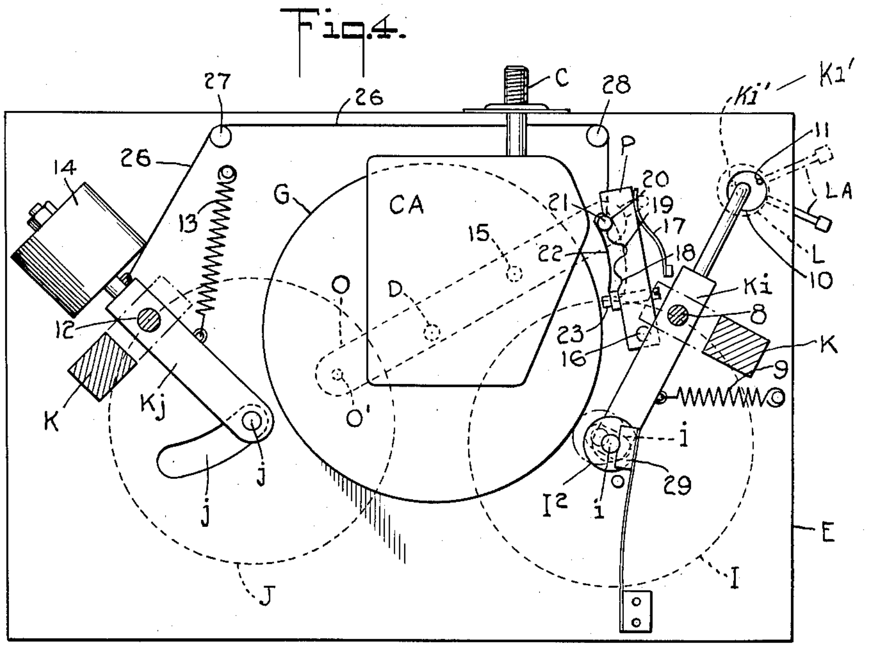
Fig. 4 is a diagrammatic rear elevation, with parts broken away and removed, of the recorder in its "drive" condition.
Figure 5:
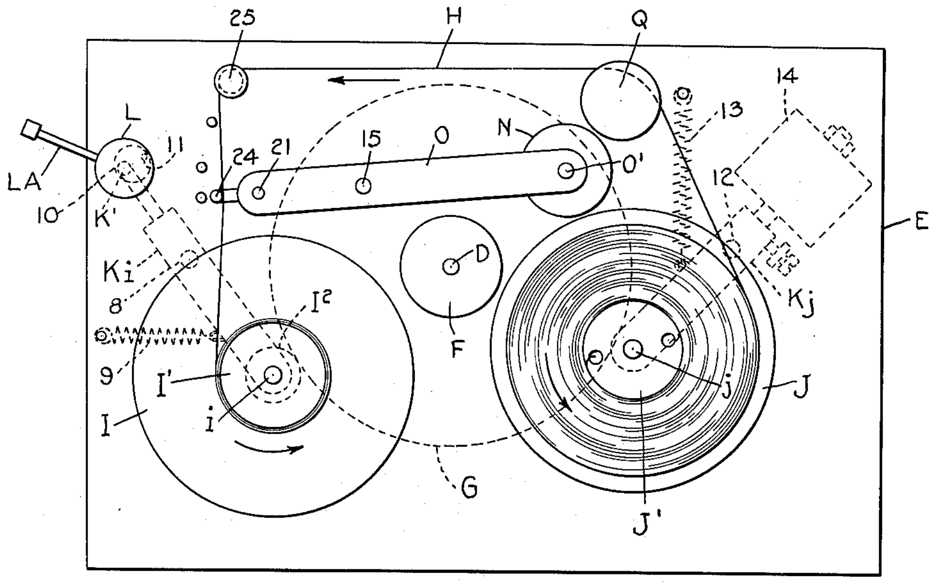
Fig. 5 is a view generally similar to Fig. 3, but with the recorder in its "rewind" condition.

The reel J is supported by an arm K*j* which is similar to the arm K*i*, and is journalled on a pivot 12 mounted in a bracket K. The latter is secured to the base plate E, and may be a duplicate of the bracket K associated with the arm K*i*. The arm K*j* is biased by a spring 13 for movement about the pivot 12 in the clockwise direction, as seen in Figs. 3 and 5, and in the counter-clockwise direction as seen in Fig. 4. As shown, the end of the arm K*j* remote from the reel J, carries an adjustable counterpoise 14. The purpose and effect of the counterpoise is to make the angular adjusting effect of the bias spring 13 on the reel J independent of the force of gravity. Thus the operation of the recorder is substantially independent of the position of the housing A relative to the earth, so that no change in the position of the recorder will effect its operativeness. To permit the desired angular adjustment of the arms K*i* and K*j*, the respective slots or openings *i'* and *j'* in the base plate E through which the shafts *i* and *j* extend, are shaped to accommodate the maximum required angular adjustments of said arms.

Figure 6:
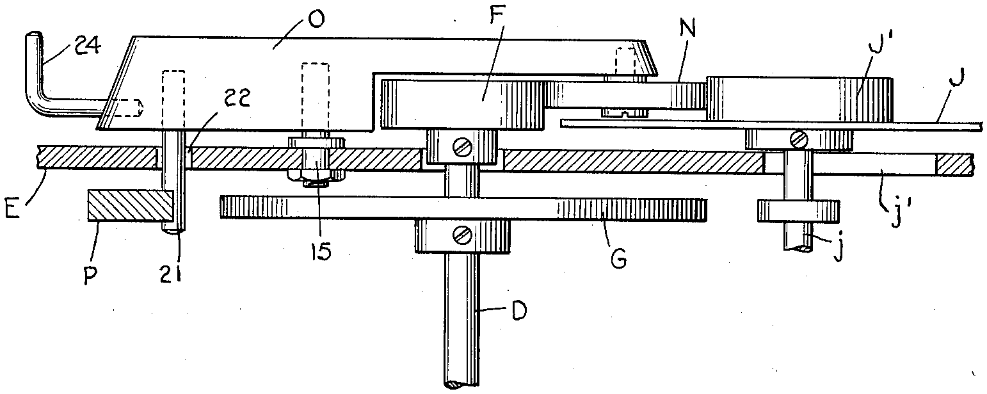
Fig. 6 is a section on the line 6—6 of Fig. 3.

In normal operation, during each period in which the tape H is being drawn away from the supply reel I by the reel J, the latter is operatively connected to the driving wheel F by an idler wheel N interposed between the rim of the wheel F and the roll of tape H on the spool J' of the reel J. Thus as shown in Fig. 3, in the recorder "drive" condition, the axes of the wheels F and N and the spool J' are parallel to and in, or in close proximity to, the same plane transverse to the base plate E. The idler wheel N is formed of rubber, or with a rubber rim portion, and is mounted to revolve around a pivot or shaft O' carried by a control arm O. The latter is supported by the base plate E through a pivot 15 secured to said plate as shown in Fig. 6. With apparatus operating as indicated in Fig. 3, the rate of travel of the tape H passing from reel I to the take-up reel J is substantially constant, although the angular speed of the reel J progressively decreases as the diameter of the tape roll wound on the spool J' increases.

When rewinding is desired, the control arm O is turned from its position shown in Fig. 3 into its position shown in Fig. 5, in which the wheel N is out of engagement with the wheel F, and the control element L is turned to move the hub $I^2$ of the reel I into operative engagement with the fly wheel G. In the preferred form of the invention illustrated, the control arm O has an intermediate position shown in Fig. 2, in which the wheel N is out of engagement with the wheel F, and in which the hub $I^2$ is out of engagement with the fly wheel G. The control arm thus has three definite angular positions respectively shown in Figs. 2, 3 and 5. Normally, the control arm O is releasably locked in one or another of its three positions by a latching member P, shown in Fig. 4. The member P is at the rear side of the base plate E and is pivotally connected to the latter by a pivot pin 16, transverse to and supported by the base plate E. As is shown in Fig. 4, a spring 17 biases the member P for movement in the counter-clockwise direction as seen in Fig. 2. The bias spring 17 thus tends to turn the member P toward the control arm pivot 15.

Notches 18, 19 and 20 facing the pivot 15, are formed in the edge of the member P at progressively increasing distances from its supporting pivot 16. The member P with its notches 18, 19 and 20 may thus be regarded as a profile cam and cooperates with a pin 21 carried by the control arm O to releasably hold the latter in its three different positions. The pin 21 is perpendicular to the base plate E and extends through a slot 22 in the latter, as is shown in Figs. 4 and 6. The pin 21 is normally received in one or another of the notches 18, 19 and 20. When the pin 21 is received in the notch 20, the control arm O is in its normal "drive" position shown in Fig. 3; when the pin 21 is received in the notch 18, the control arm is in its "rewind" position shown in Fig. 5; and when the pin 21 is received in the intermediate notch 19, the control arm O is in its "at rest" position shown in Fig. 2. When the control arm O is in its last mentioned position, the wheel N is out of engagement with the drive wheel F, and the member P prevents rotation of the fly wheel G.

The notches 18 and 20 are so positioned relative to the pivots 15 and 16 that the arm P occupies substantially the same angular position when the pin 21 enters either of the notches 18 and 20. The form and disposition of the intermediate notch 19 is such that when it receives the pin 21 it permits the member P to move closer to the pivot 15 than it can when pin 21 is in either of notches 18 or 20. The purpose and effect of movement of the member P nearer to the pivot 15, is the movement of a brake element 23 carried by the arm P, into braking engagement with the edge of the fly wheel G to thereby prevent rotation of the motor output shaft D. The brake element 23 may have a leather tip.

While the control arm O has three different control positions, the member L has only two operative positions; namely, a position in which it does, and a position in which it does not hold the arm K′ in its dotted line position shown in Fig. 4. The effect of pressing the hub $I^2$ against the fly wheel G depends upon the position of the control arm. When the latter is in its "at rest" position shown in Fig. 2, the movement of the hub $I^2$ into engagement with the then stationary fly wheel G is without operative effect on the reel movements. When the control arm O occupies its "rewind" position shown in Fig. 5, the engagement of the hub $I^2$ with the wheel G rotates the reel I, and thereby the reel J, in the counterclockwise direction to unwind tape H from the reel J and rewind it on the reel I. When the control arm O is in its "drive" position shown in Fig. 3, the effect of moving the member L into the position in which the hub $I^2$ is pressed against the edge of the wheel G, is to neutralize the normal tendency of the wheels F and N to rotate the reel J in the direction to draw tape H away from the supply reel I and wind it up on the take-up reel J.

The control device L with its arm LA, thus forms what I call a "stop-go" control device, since the angular adjustment of the arm LA into its two different operating positions will permit or prevent movement of the tape H from the supply reel I to the take-up reel J, when the control arm O is in its "drive" position shown in Fig. 3. The adjustment of the control arm O from one position into another is effected manually, and can be effected only when the casing section *a* is removed to provide access to the control arm. However, with the control arm O in its "drive" position shown in Fig. 3, the "stop-go" control action can be effected by adjustment of the arm LA with the casing part *a* in place, as well as when it is separated from the body of the casing A.

To avoid risk of contact of the wheel N with the tape wound on the spool J′ of the reel J when the "stop-go" arm LA is turned into its rewind position shown in dotted lines in Fig. 4, I provide means for then moving the reel J away from the wheel N. Said means comprises a wire, cord or other flexible element 26 running over guide pins 27 and 28, and having one end connected to the arm Kj and having its opposite end connected to the pin 21 carried by the control arm O. The element 26 is of such length and so disposed that when the pin 21 is in the notch 18, the arm Kj is turned about its pivot 12 into a position in which the wheel N cannot engage the roll of tape on the spool J′ even though that roll then has its maximum diameter.

The control arm O carries a hook 24 at its end remote from the pivot O′ which engages the tape H moving between the reel I and a stationary guide pin 25. The parts are so proportioned that when the control arm O is in its drive position, the hook 24 makes the angular contact of the tape with the pin 25 appreciably greater than when the control arm O is in either of its other positions. The increased angular contact of the tape with the pin 25 thus effected, increases the tension of the portion of the tape passing from the pin 25 to the take-up reel J. Such increased tension insures snug continuous contact of the tape with the magnetic head Q over which the tape H passes in moving from the pin 25 to the take-up reel. The tape H passing over the magnetic head Q from the pin 25 to the take-up reel, is advantageously taut, not only in the original creation of a magnetic tape record, but also in the play-back of the record. As shown in Fig. 4, tape being drawn from the reel I is kept taut by a felt friction brake 19 then subjecting reel shaft *i* to a light braking force.

The recorder includes apparatus of novel character for erasing a record on the tape strip H or a particular portion thereof, when desirable. That apparatus comprises an eraser element R which is a permanent magnet or a magnetic head which when in use, is mounted in a bracket 30 attached to the upper side of the control arm O adjacent its end remote from the wheel N. The bracket 30 and element R are so arranged that when the control arm is in its "drive" position, the upper side of the element R bears against the under side of the portion of the tape H between the guide pin 25 and the magnetic head Q. With the eraser element R mounted on the control arm O, there is no risk of accidental erasure of a record on the tape H in a tape rewinding operation, since the rewinding operation can occur only when the control arm is out of the position shown in Fig. 3 and is in the position shown in Fig. 5. The eraser element R when not in use, is conveniently held by magnetic action in contact with a magnetic body *r* attached to the front side of the base plate E.

As shown in Fig. 2, the base plate E supports a neon glow lamp volume level indicator S, a rotatable record-playback-off function switch T, and a rotatable volume control member U. The removable cover *a* is formed with a port normally closed by a door V with a mirror at its inner side. This enables the operator carrying the recorder to visually determine whether the drive mechanism is operating by opening the door and looking at the mirror, which as shown is in position to reflect an image of the take-up reel J. The electronic mechanism back of the base plate E may be connected to a phone head set and to a microphone by plugs W and X, respectively. The sound effect impressed on the unillustrated amplifier back of the base plate E by a microphone through the plug X, may be continuously or intermittently monitored by means of a head set, not shown, which may be connected to the amplifier through the plug W.

In the use of a recorder embodying the present invention, the energizing means for the amplifier may consist of a single 67 volt dry battery and two flashlight, A-battery cells.

The recording mechanism as distinguished from the tape drive mechanism, need involve nothing novel in principle. However, the simplicity of the novel drive mechanism, and its low friction losses which make it practically feasible to give the magnetic tape its movements by means of a phonograph type spring motor, make the power requirements of the recorder so relatively small that excellent performance is obtained with small batteries having long lives.

The counter-weight 14 and the take-up reel J are so positioned relative to the shaft 12 on which the arm K*j* is pivoted, and the weight of the counter-weight, the weight of the take-up reel, and the maximum weight of the tape wound on the take-up reel and the weight of the portions of the arm K*j* at opposite sides of the shaft 12 are so related that when the tape wound on the spool J is only half of the maximum amount which is to be wound on that spool, the arm K*j* and parts supported by it are in balance in all positions of the shaft 12 relative to the earth's axis. The weight of the tape H is relatively small and only a relatively small variation in the weight of the take-up reel occurs as the amount of tape wound thereon varies between its minimum and maximum values. In consequence, the operation of the recorder is not significantly affected by the recorder attitude, and the recorder will operate satisfactorily in all positions of the shaft 12 relative to the earth's axis.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a magnetic tape recorder including supporting structure, the improved tape drive mechanism mounted in said structure and comprising a rotatable drive shaft, a first tape reel, means for moving said first reel into and out of an operative position in which said first reel is in operative engagement with said drift shaft for rotation of said reel, a first biasing means yieldingly holding said first reel out of its said operative position, a second tape reel, means for moving said second tape reel into and out of an operative position in which the tape wound on said second reel is in operative engagement with said drive shaft for rotation of said second reel, a second biasing means tending to maintain said second tape reel in its operative position, means selectively operable to respectively maintain one or the other of said reels in its said operative position while the other of said reels is held out of its operative position, a spring motor mounted in said structure, and having a winding shaft with one end of said shaft extending away from said structure, and in which said drive shaft is the output shaft of said spring motor and carries a drive wheel, and having an idler wheel movable into and out of a position in which it operatively connects said drive wheel to the tape wound on said second reel.

2. A magnetic tape recorder as specified in claim 1, including a spring motor mounted in said structure, and having a winding shaft with one end of said winding shaft extending away from said structure, and in which said drive shaft is the output shaft of said spring motor and carries a drive wheel, and having an idler wheel movable into and out of a position in which it operatively connects said drive wheel to the tape wound on said second reel.

3. A magnetic tape recorder including a supporting structure and apparatus mounted therein and comprising a supply reel, a take-up reel, mechanism selectively operative to rotate either reel in a direction in which it withdraws tape from the other reel, means for guiding the tape passing between the two reels along a predetermined path, said mechanism including a driving element continuously rotatable in one direction, a transmission wheel, a control element on which said wheel is mounted and which is adjustable into and out of a position in which said wheel is in operative engagement with said driving element and with tape wound on the take-up reel, magnetic recording means operative when energized to form a magnetic record on tape moving along said path from said supply reel to said take-up reel, an eraser element mounted on said control arm and held by the latter in or out of operative engagement with the tape moving along said path accordingly as the control arm is in or out of position to cause said tape to move from the supply reel to the take-up reel.

4. A tape recorder including supporting structure and apparatus mounted therein and comprising a supply reel, a take-up reel, mechanism selectively operative to rotate either reel in the direction to withdraw tape from the other reel, said mechanism including a driving element normally rotating continuously in one direction, a control element adjustable into three different positions, and mechanism controlled by said control element and operative to establish a driving connection between said driving element and supply reel when said control element is in one position, and operative to establish a driving connection between said driving element and the tape wound on said take-up reel when said control element is in a second position, and operative to interrupt rotation of said driving element when the control element is in its third position, and in which said control element is mounted for angular adjustment about a first axis into its first, second and third positions and comprises a locking part displaced from said first axis, a latching member mounted to turn about a second axis displaced from said first axis toward and away from the latter and formed with three recesses at such respectively different distances from said second axis that each recess is adapted to receive said locking part when said control element is in one of its positions different from its positions in which it is respectively received in each of said other recesses, and in which said recesses are so disposed from said first axis that when said control element occupies its third poistion and its locking part is received in the corresponding recess, said latching part is nearer to said first axis than when said locking part is received in either of the other recesses, and said latching member then engages and arrests the rotation of said driving element.

5. In a magnetic tape recorder including supporting structure, the improved tape drive mechanism mounted in said structure and comprising a rotatable drive shaft, a first tape reel, means for moving said first reel into and out of an operative position in which said first reel is in operative engagement with said drive shaft for rotation of said reel, a first biasing means yieldingly holding said first reel out of its said operative position, a second tape reel, means for moving said second tape reel into and out of an operative position in which the tape wound on said second reel is in operative engagement with said drive shaft for rotation of said second reel, a second biasing means tending to maintain said second tape reel in its operative position, means selectively operative to respectively maintain one or the other of said reels in its said operative position while the other of said reels is held out of its operative position, and in which said second reel is supported by an arm pivotally connected to said structure to turn about an axis parallel to and displaced from said drive shaft and displaced in one direction from the axis of said second reel, and in which a counterweight is mounted on said arm with its center of gravity displaced from said axis in a direction opposite to the displacement therefrom of said second reel, said counter-weight and second reel being relatively proportioned and arranged to make the operation of the recorder substantially independent of the relation of said axis to the earth's axis.

References Cited in the file of this patent

UNITED STATES PATENTS

| | | |
|---|---|---|
| 1,595,277 | Wittel | Aug. 10, 1926 |
| 2,369,017 | Camras | Feb. 6, 1945 |
| 2,408,320 | Kuhlik | Sept. 24, 1946 |
| 2,438,222 | Lear | Mar. 23, 1948 |
| 2,451,947 | Harvey | Oct. 19, 1948 |
| 3,457,699 | Marsen | Dec. 28, 1948 |
| 2,467,507 | Stone | Apr. 19, 1949 |
| 2,525,995 | Barbara et al. | Oct. 17, 1950 |
| 2,526,783 | Toogood | Oct. 24, 1950 |
| 2,528,279 | Leedy et al. | Oct. 31, 1950 |
| 2,555,643 | Harrison | June 5, 1951 |